United States Patent
Kishiyama et al.

(10) Patent No.: US 8,391,911 B2
(45) Date of Patent: Mar. 5, 2013

(54) TRANSMIT POWER CONTROL METHOD, BASE STATION APPARATUS AND USER APPARATUS

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 427 days.

(21) Appl. No.: 12/665,371

(22) PCT Filed: Jun. 16, 2008

(86) PCT No.: PCT/JP2008/060999
§ 371 (c)(1),
(2), (4) Date: Apr. 7, 2010

(87) PCT Pub. No.: WO2008/156063
PCT Pub. Date: Dec. 24, 2008

(65) Prior Publication Data
US 2010/0197336 A1    Aug. 5, 2010

(30) Foreign Application Priority Data

Jun. 19, 2007 (JP) .................. 2007-161950

(51) Int. Cl.
*H04B 7/00* (2006.01)
(52) U.S. Cl. ............ 455/522; 455/68; 455/69; 455/450; 455/451; 455/452.1
(58) Field of Classification Search ............ 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| 6,934,275 B1* | 8/2005 | Love et al. ............ 370/342 |
| 8,107,986 B2* | 1/2012 | Cho et al. ............ 455/522 |
| 8,155,104 B2* | 4/2012 | Yoon et al. ............ 370/349 |

(Continued)

FOREIGN PATENT DOCUMENTS

JP      2004-289842 A      10/2004

OTHER PUBLICATIONS

International Search Report w/translation from PCT/JP2008/060999 dated Jul. 8, 2008 (3 pages).

(Continued)

*Primary Examiner* — Dominic E Rego
(74) *Attorney, Agent, or Firm* — Osha Liang LLP

(57) ABSTRACT

Even if no uplink transmission grant is assigned from a base station, transmit power can be controlled in uplinks with accuracy to some extent. An aspect of the present invention relates to a base station apparatus for use in a radio communication system using a shared channel, comprising: a transmit power control information generation unit configured to generate transmit power control information for a user apparatus based on an uplink signal transmitted from the user apparatus; a radio resource control unit configured to transmit the generated transmit power control information together with an uplink assignment message if an uplink radio resource is assigned to the user apparatus and to supply radio resource assignment information to transmit the generated transmit power control information as independent transmit power control information if no uplink radio resource is assigned to the user apparatus.

17 Claims, 9 Drawing Sheets

U.S. PATENT DOCUMENTS

| | | | |
|---|---|---|---|
| 2002/0012326 A1* | 1/2002 | Chang | 370/318 |
| 2003/0086389 A1* | 5/2003 | Hayashi et al. | 370/328 |
| 2005/0025098 A1* | 2/2005 | Terabe | 370/332 |
| 2005/0032551 A1* | 2/2005 | Lee et al. | 455/560 |
| 2006/0098569 A1* | 5/2006 | Han et al. | 370/208 |
| 2006/0286992 A1* | 12/2006 | Vitebsky et al. | 455/512 |
| 2007/0049280 A1* | 3/2007 | Sambhwani et al. | 455/442 |
| 2007/0110000 A1* | 5/2007 | Abedi | 370/332 |
| 2007/0197254 A1* | 8/2007 | Borran et al. | 455/522 |
| 2007/0203375 A1* | 8/2007 | Yang et al. | 585/251 |
| 2008/0188219 A1* | 8/2008 | Fischer | 455/434 |
| 2008/0287130 A1* | 11/2008 | Laroia et al. | 455/436 |

OTHER PUBLICATIONS

Written Opinion from PCT/JP2008/060999 dated Jul. 8, 2008 (3 pages).

3GPP TSG RAN WG1 Meeting #49, R1-072419; "Intra-Node B TPC for Non-Scheduled Data Transmission in E-UTRA Uplink"; NTT DoCoMo, Inc.; Kobe, Japan; May 7-11, 2007 (2 pages).

Patent Abstracts of Japan; Publication No. 2004-289842 dated Oct. 14, 2004 (1 page).

* cited by examiner

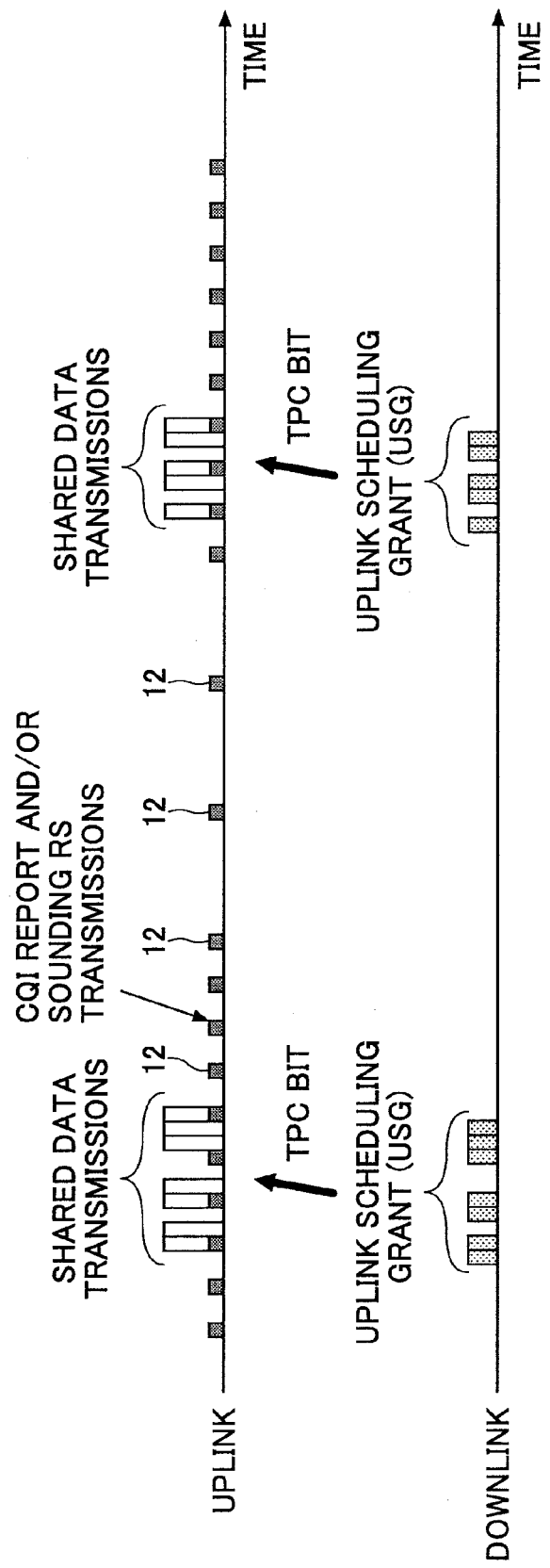

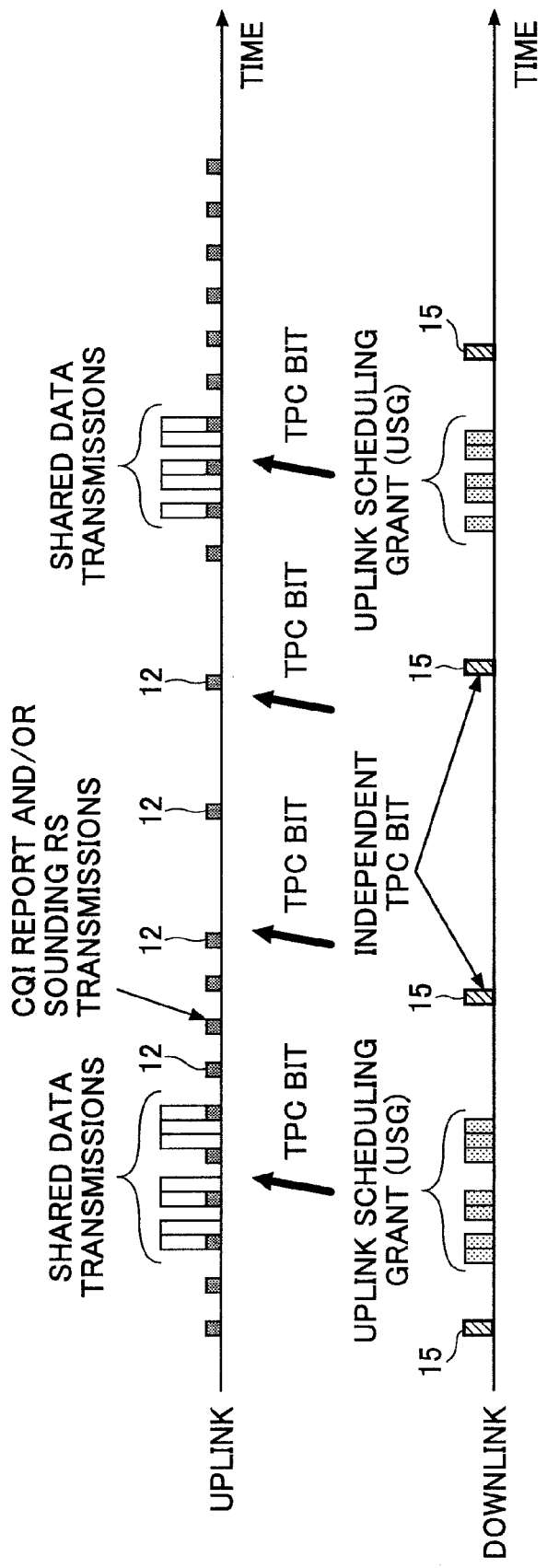

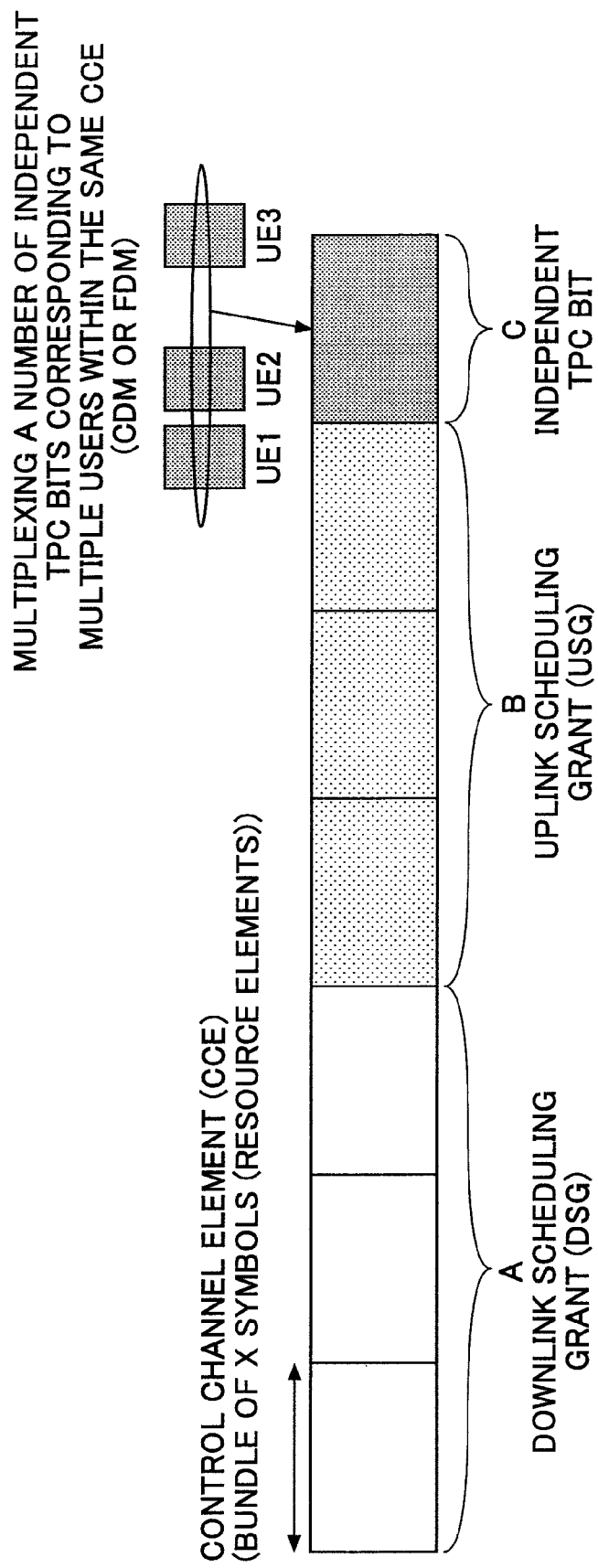

TRANSMIT POWER CONTROL METHOD, BASE STATION APPARATUS AND USER APPARATUS

TECHNICAL FIELD

The present invention generally relates to the technical field of mobile communications and more particularly relates to a method of controlling transmit power for signals transmitted in uplink shared channels and arrangements of a base station apparatus and a user apparatus.

BACKGROUND ART

Popularization of mobile terminals such as cellular phones and expansion of multimedia prompt standardization of an IP based radio access scheme with less delay. This standardized scheme is called Evolved UTRA (UMTS Terrestrial Radio Access). In the Evolved UTRA, it is recognized that an OFDM (Orthogonal Frequency Division Multiplexing) scheme may be promising for downlink communications from the viewpoint of fast and high-capacity communications as well as efficient utilization of wideband frequencies. On the other hand, a SC-FDMA (Single-Carrier Frequency Division Multiple Access) scheme may be promising for uplink communications in that wider coverage is given higher priority for the uplink communications than higher data rates (particularly improvement of communication quality of user apparatuses residing at cell edges is given higher priority) and the SC-FDMA is advantageous to reduce PAPR (Peak-to-Average Power Ratio).

In order to reduce variations of receive power at a base station for improved link capacity, the receive power at the base station must be kept constant through control of transmit power at user apparatuses. Conventionally, in the case where the transmit power for the mobile terminal is controlled under the base station (closed loop), channels dedicated to individual users are provided, and pilot signals from the mobile terminals as well as transmit power control signals generated based on measurements on the pilot signals are transmitted in the user dedicated channels.

DISCLOSURE OF INVENTION

Problem to be Solved by the Invention

Meanwhile, it is being discussed for the Evolved UTRA that a channel arrangement having channels shared among multiple users be used and that frequency resources be assigned to individual users depending on respective radio states so as to improve utilization efficiency of radio resources. As a result, the characteristic of channel sharing among the multiple users must be taken into consideration for controlling the transmit power for the user apparatuses. In addition, it is necessary to appropriately control not only the transmit power for data channels but also the transmit power for control signals transmitted in uplink control channels.

FIG. 1 schematically illustrates an object to be achieved for the Evolved UTRA, that is, efficient transmit power control must be proposed corresponding to the channel sharing. In the Evolved UTRA, in response to assignment requests (scheduling requests) from user apparatuses, a base station transmits USGs (Uplink Scheduling Grants) to the user apparatuses for scheduling uplink data transmissions from the user apparatuses. The USG includes transmit power control information referred to as TPC bits. The user apparatuses use radio resources assigned by the base station to transmit data to the base station in uplink shared data channels. At this time, the transmit power of the user apparatuses is adjusted based on the TPC bits in the USG to minimize the transmit power under data rates of transmitted traffic and radio environment.

In uplink shared control channels, the user apparatuses also transmit CQI reports and ACK/NACK (reception acknowledgement) used for scheduling at the base station or transmit pilot signals referred to as SRSs (Sounding Reference Signals) used to measure reception quality for controlling the transmit power. These uplink information items are collectively referred to as CQI report/SRS 12.

Radio resources for uplink L1/L2 control channels to transmit the CQI reports and the ACK/NACK and for the SRS transmissions are assigned at the beginning of communications or during the communications through upper layer signaling, which is not involved in the USG. This means that the information bits to control the transmit power for the CQI report/SRS 12 cannot be transmitted in the USGs.

Thus, the power control information (TPC bits) is not supplied in intervals without uplink data transmission, that is, in intervals where the USGs are not transmitted from the base station. As a result, the user apparatuses would continue transmitting the CQI report/SRS 12 at the transmit power level adjusted based on the last TPC bit until the next USG is transmitted from the base station. In the case where the actually required transmit power level rises during the intervals depending on variations of the radio communication environment, even if the TPC bit is transmitted at the next data transmission opportunity, the transmit power cannot be properly controlled to track the actual radio communication environment.

One object of the present invention is to provide a transmit power control method for enabling the transmit power to be accurately controlled for user apparatuses even in uplink shared data channels.

Another object of the present invention is to provide arrangements of a base station and a user apparatus that can implement this transmit power control method.

Means for Solving the Problem

In order to solve the above-mentioned problem, in a radio communication system using a shared channel, if an uplink assignment message or uplink scheduling grant (USG) is not transmitted to a user apparatus, independent transmit power control information (TPC bit) is transmitted from a base station using a predefined radio resource.

Specifically, a first aspect of the present invention relates to a base station apparatus for use in a radio communication system using a shared channel, comprising: a transmit power control information generation unit configured to generate transmit power control information for a user apparatus based on an uplink signal transmitted from the user apparatus; a radio resource control unit configured to transmit the generated transmit power control information together with an uplink assignment message if an uplink radio resource is assigned to the user apparatus and to supply radio resource assignment information to transmit the generated transmit power control information as independent transmit power control information if no uplink radio resource is assigned to the user apparatus.

In preferred embodiments, the radio resource control unit may be configured to determine a radio resource assigned to the independent transmit power control information based on correspondence information for associating with predefined radio resources in one-to-one correspondence. The correspondence information may be information for associating a radio resource used to transmit the uplink signal with a radio resource used to transmit the independent transmit power control information to the user apparatus. Alternatively, the correspondence information may be information for associating a radio resource used to transmit the last uplink assignment message to the user apparatus with a radio resource used to transmit the independent transmit power control information to the user apparatus.

A second aspect of the present invention relates to a user apparatus for use in a radio communication system using a shared channel, comprising: a timing generation unit configured to generate a timing for demodulating independent transmit power control information transmitted from a base station to the user apparatus based on predefined correspondence to radio resources; a demodulation unit configured to extract and demodulate the independent transmit power control information from a received signal at the generated timing; and a transmit power adjustment unit configured to adjust transmit power for the user apparatus based on a result of the demodulation.

In a preferred embodiment, the transmit power control information demodulation unit may be configured to demodulate transmit power control information in an uplink assignment message destined for the user apparatus if the uplink assignment message is included in the received signal.

A third aspect of the present invention relates to a transmit power control method for use in a radio communication system using a shared channel, comprising the steps of: generating transmit power control information for a user apparatus based on an uplink signal transmitted from the user apparatus; and transmitting the transmit power control information together with an uplink assignment message if an uplink radio resource is assigned to the user apparatus and transmitting the transmit power control information as independent transmit power control information if no uplink radio resource is assigned to the user apparatus.

Advantage of the Invention

According to the aspects of the present invention, even if a channel is shared among multiple user apparatuses, the respective transmit power for the user apparatuses can be controlled with accuracy to some extent.

BRIEF DESCRIPTION OF DRAWINGS

FIG. 1 schematically illustrates simple uplink transmit power control in communications between multiple user apparatuses and a base station in shared channels;

FIG. 2 illustrates uplink transmit power control according to one embodiment of the present invention;

FIG. 4A illustrates exemplary multiplexing of independent TPC bits and exemplary multiplexing into a control channel element (CCE) according to one embodiment of the present invention;

LIST OF REFERENCE SYMBOLS

Figure 3A:
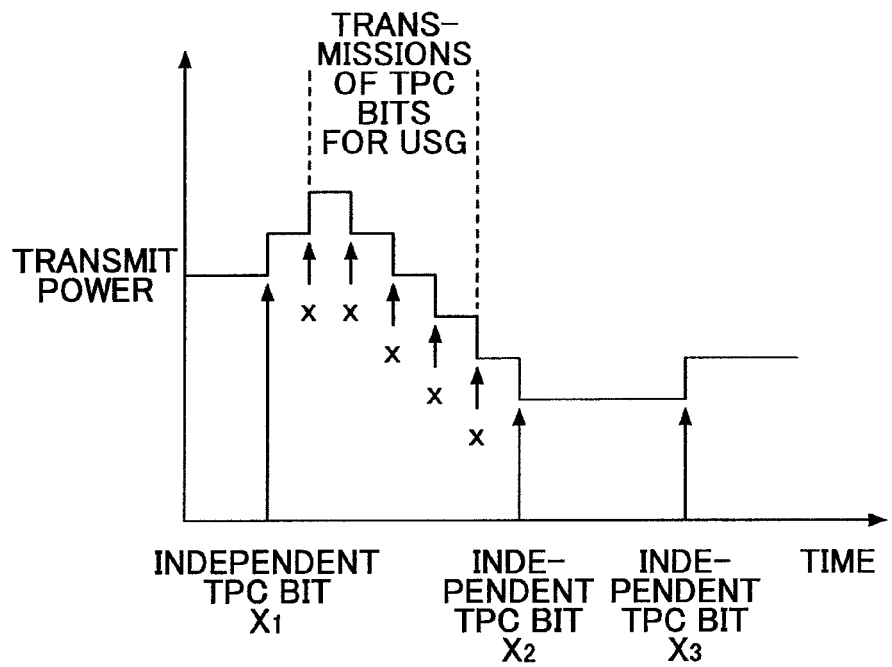
FIG. 3A illustrates an effect of uplink transmit power control according to one embodiment of the present invention.

12: CQI report/SRS (uplink signal)
15: independent TPC bit (independent transmit power control information)
20: base station apparatus
21: buffer
22: radio resource control unit
23: control channel generation unit
24: TPC bit generation unit (transmit power control information generation unit)
26: uplink reception signal demodulation unit
30: user apparatus
31: TPC timing generation unit
32: TPC bit demodulation unit
33: channel generation unit
34: data modulation unit
35: transmit power adjustment unit

BEST MODE FOR CARRYING OUT THE INVENTION

Preferred embodiments of the present invention are described below with reference to the drawings. FIG. 2 schematically illustrates transmit power control according to one embodiment of the present invention. In the present invention, TPC bits 15 independent of TPC bits in USGs are used together. These information bits are referred to as "independent TPC bits 15" to distinguish from the TPC bits in the USGs.

In the embodiment illustrated in FIG. 2, if uplink radio resources are assigned to a user apparatus, that is, if a data channel assignment request (scheduling request) is issued from the user apparatus, a base station inserts a TPC bit into a USG for transmission and finely controls transmit power for the user apparatus. As a result, a data channel and a CQI report/SRS 12 generated at the user apparatus can be transmitted at an appropriate power level. After completion of the transmission of data channel, the user apparatus also uses an uplink control channel or other uplink radio resources to transmit the CQI report/SRS 12. If no user data has to be transmitted in a long time period, the transmission interval of the CQI report/SRS 12 may be set more widely per instruction from an upper layer.

Even if no scheduling request is issued from the user apparatus, the base station transmits an independent TPC bit 15 in a downlink control channel such as a L1/L2 control channel. The user apparatus controls the transmit power depending on values of the independent TPC bit 15. As a result, the user apparatus can transmit the CQI report/SRS 12 to the base station under the state where the transmit power is controlled rather properly.

In addition, when a data channel is transmitted at the next time, the transmit power has been already adjusted to a power level suitable for the radio environment through the immediately preceding independent TPC bit 15. Thus, the transmit power can be promptly made convergent to a required power level based on TPC bits in USGs.

In this embodiment, the independent TPC bits 15 are transmitted at a constant interval. In other embodiments, the transmission interval of the independent TPC bits 15 may be changed depending on the situation.

Figure 3B:
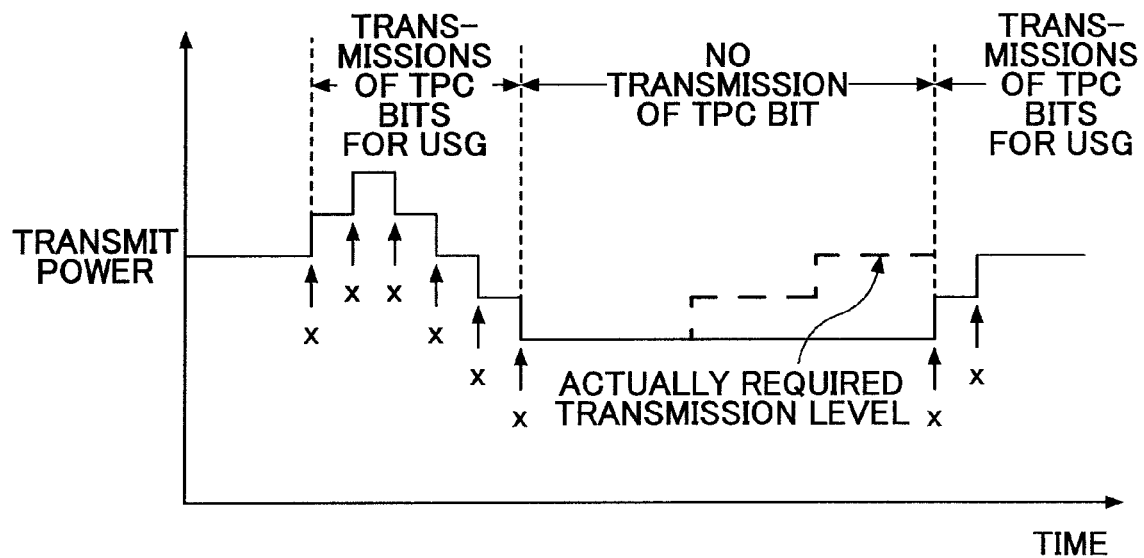
FIG. 3B illustrates the transmit power control according to the method in FIG. 1 as a comparison example.

FIG. 3A illustrates an effect of a transmit power control method according to one embodiment of the present invention, and FIG. 3B illustrates a comparison example of the transmit power control method in FIG. 1. FIGS. 3A and 3B illustrate transition graphs of the transmit power for a user apparatus during a time period. In the transmit power control method illustrated in FIG. 3A, a TPC bit X1 is transmitted independent of a USG from a base station before initiation of transmission of a data channel from the user apparatus, and the user apparatus is instructed to raise the transmit power level corresponding to deterioration of the radio environment. When a USG is transmitted from the base station to the user apparatus under this state, the user apparatus transitions to finer power control through TPC bits x in the USG. This control continues during the transmission of data channel.

Also after completion of the data transmission, the transmit power level for the user apparatus may be adjusted rather properly through independent TPC bits X2 and X3 depending on the radio environment. Thus, reception variations of the CQI report/SRS at the base station can be reduced. Furthermore, when a data channel is transmitted to the user apparatus the next time, the user apparatus could easily converge into a required transmit power level.

On the other hand, in the transmit power control method illustrated in FIG. 3B, once transmission of a data channel permitted in a USG is completed, the TPC bit is not transmitted from the base station until the next transmission of a data channel. In this case, even if the actually required transmit power level rises corresponding to deterioration of the radio environment as illustrated in a dashed line, the transmit power for the user apparatus remains unchanged at the power level set through the last TPC bit in the previous USG. As a result, when the next data channel has to be transmitted, it might be difficult to use only the TPC bits in the USG to achieve the actually required transmit power level immediately.

According to the above embodiment of the present invention, even if the user apparatus has no data for transmission for some time, both the independent TPC bits and the TPC bits in the USG can be used to control the transmit power accurately.

Figure 4B:
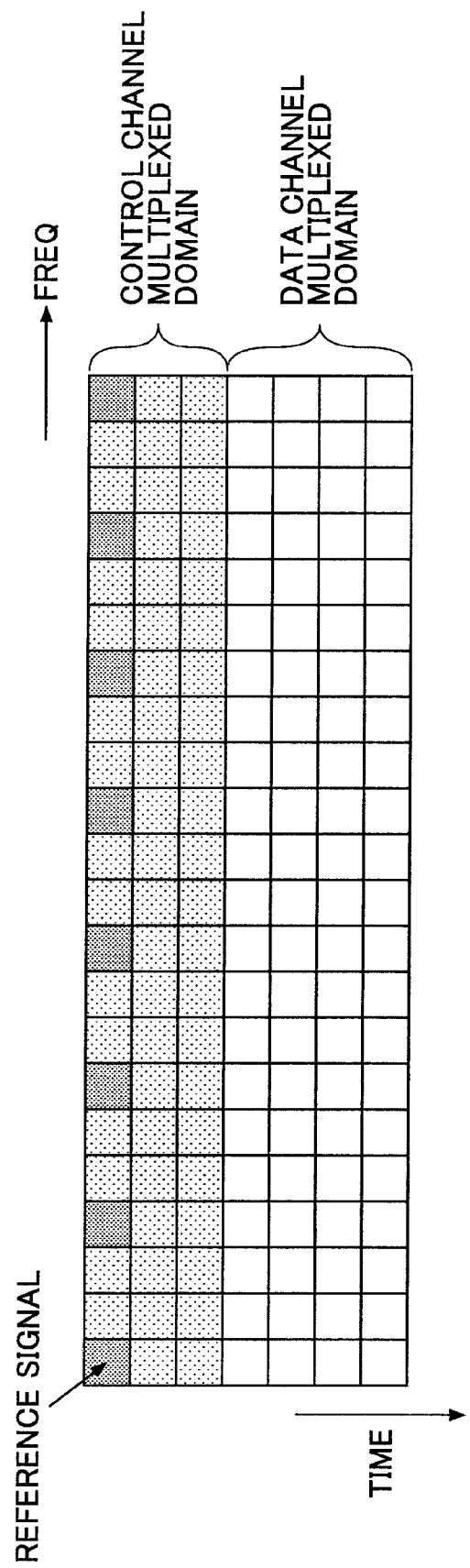
FIG. 4B illustrates exemplary multiplexing of the independent TPC bits into subframes.

FIGS. 4A and 4B illustrate exemplary multiplexing of the independent TPC bits. In one embodiment of the present invention, as illustrated in FIG. 4A, some of radio resources assigned for USGs are used for transmission of the independent TPC bits. For example, if four control channel elements (CCEs) are reserved for transmission of the USGs, one of the CCEs is assigned to transmission of the independent TPC bits, and a number of independent TPC bits corresponding to the number of the user apparatuses are multiplexed within the same CCE. The term "control channel element (CCE)" used herein means a block of X symbols (resource elements).

The independent TPC bits may be multiplexed in accordance with a CDM scheme or a FDM scheme. For the multiple user apparatuses, the independent TPC bits may be coded in accordance with join coding or separate coding but are coded separately from other control information such as USGs. FIG. 4A also illustrates a CCE assigned to a DSG (Downlink Scheduling Grant).

FIG. 4B illustrates exemplary multiplexing into a subframe. In FIG. 4B, exemplary mapping to a physical channel after cell specific interleaving is illustrated. Independent control bits illustrated as "reference signals" are multiplexed within several (for example, three) OFDM symbols from the top of the subframe similar to other downlink L1/L2 control channels.

Figure 5:
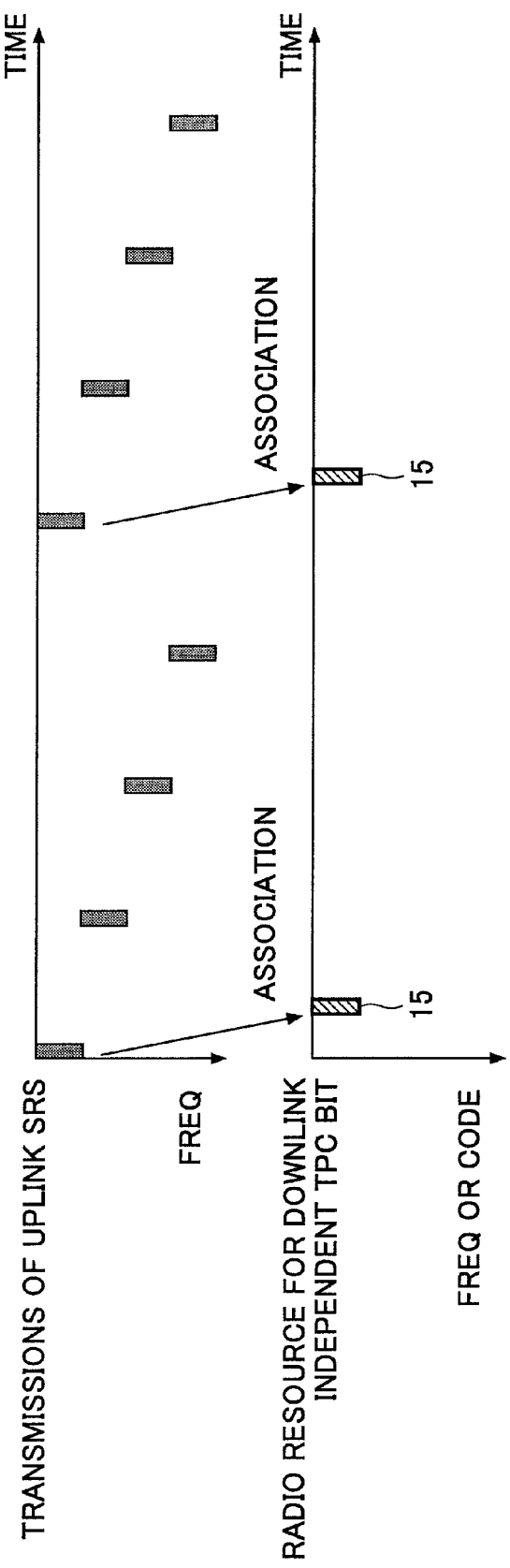
FIG. 5 illustrates a first method of assigning radio resources to the independent TPC bits.
Figure 6:
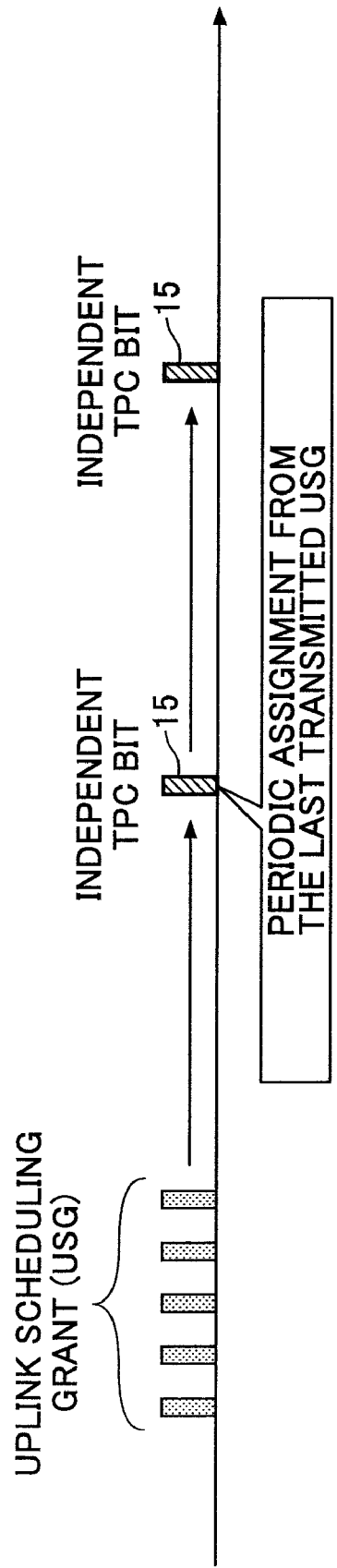
FIG. 6 illustrates a second method of assigning radio resources to the independent TPC bits.

In assignment of radio resources to the independent TPC bits, user ID information can be omitted by assigning the used radio resources in advance, resulting in reduction in the number of transmitted information bits. In FIGS. 5 and 6, some examples of the above assignment of radio resources to the independent TPC bits are illustrated.

FIG. 5 illustrates the first example of the assignment of radio resources to the independent TPC bits. In this example, radio resources are determined for downlink TPC bits in one-to-one correspondence to radio resources for uplink SRS transmission channels or control channels for transmission of CQI reports and scheduling requests. Such correspondence enables downlink radio resources for transmitting the independent TPC bits to be unambiguously determined, and no information is required to identify where the independent TPC bits are transmitted for individual user apparatuses. The correspondence is mutually known between the base station and the user apparatuses, and the independent TPC bits can be demodulated at the user apparatuses at appropriate timings. Correspondence between radio resources for uplink control signals and radio resources for downlink independent TPC bits may be indicated to the user apparatuses in an upper layer or stored in some tables at the user apparatuses in advance.

FIG. 6 illustrates the second example of the assignment of radio resources to the independent TPC bits. In this example, radio resources for the last transmitted USG are associated with radio resources assigned to the independent TPC bits. Specifically, the independent TPC bits are transmitted periodically from the last USG transmission by using radio resources corresponding to those used for the last transmitted USG. The user apparatuses know this period in advance and can know the next transmission timing of the independent TPC bits.

Figure 7:
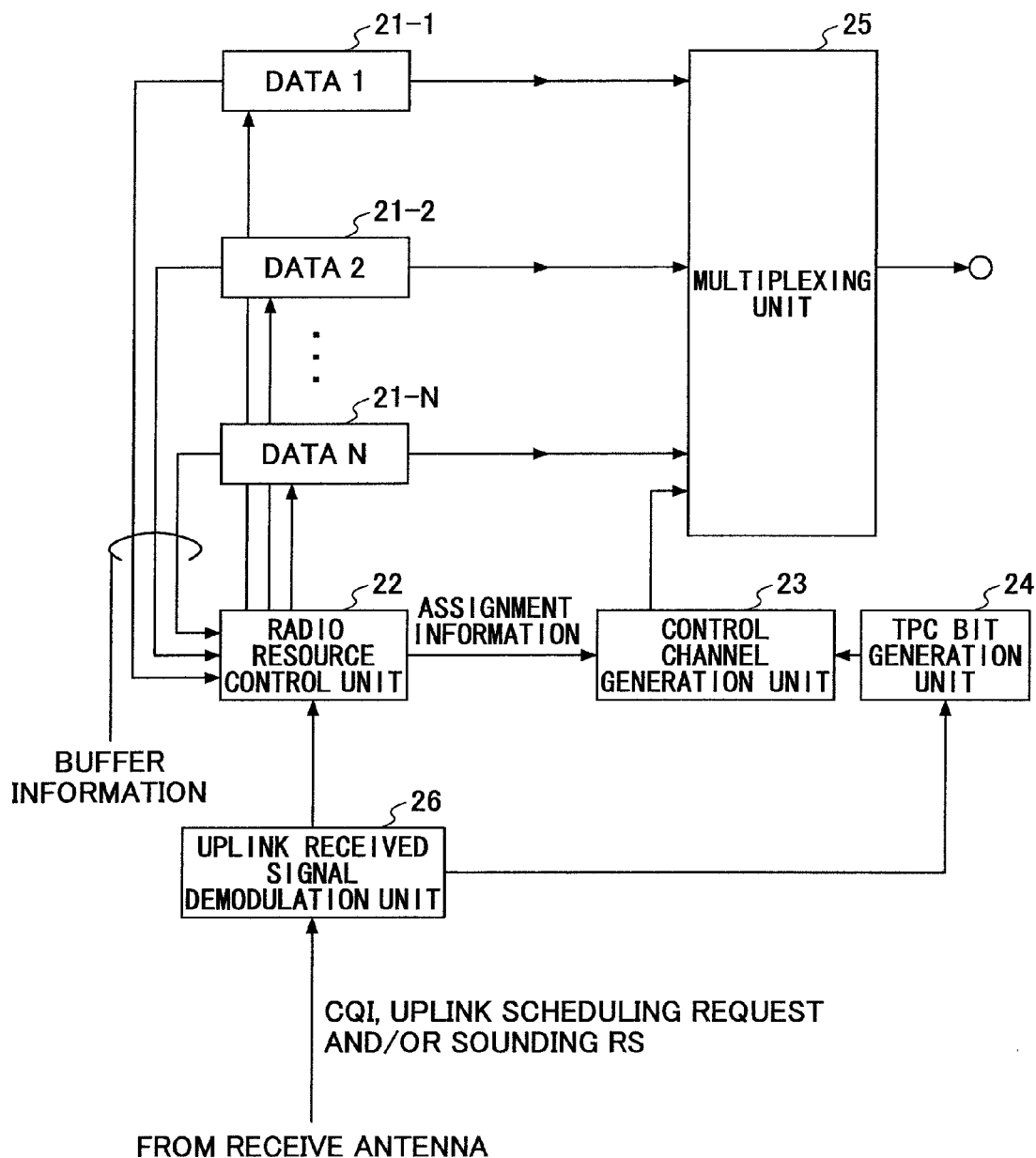
FIG. 7 illustrates an exemplary arrangement of a base station apparatus according to one embodiment of the present invention.

FIG. 7 illustrates an exemplary arrangement of a base station apparatus according to one embodiment of the present invention. A base station apparatus 20 includes buffers 21-1 through 21-N for storing user data 1, 2, . . . , N for downlink transmission to user apparatuses, an uplink received signal demodulation unit 26 for demodulating uplink received signals, a radio resource control unit 22, a control channel generation unit 23, a TPC bit generation unit 24 and a multiplexing unit 25.

The uplink received signal demodulation unit 26 extracts and demodulates various channels transmitted from the user apparatuses. For example, the uplink received signal demodulation unit 26 may extract and demodulate CQI reports and uplink scheduling requests transmitted in uplink L1/L2 control channels, traveling speeds (maximum Doppler frequencies), ACK/NACK information, SRSs transmitted in other uplink radio resources, and other information. The demodulated information is supplied to the radio resource control unit 22 and the TPC bit generation unit 24.

The TPC bit generation unit 24 generates TPC bits for user apparatuses based on measured CQI reports and/or SRSs from the corresponding user apparatuses. The TPC bits includes TPC bits transmitted during transmissions USGs and independent TPC bits. The generated TPC bits are supplied to the control channel generation unit 23.

The radio resource control unit 22 schedules transmission of user data as well as transmission of the USGs and the independent TPC bits. If uplink radio resources are assigned for the user apparatuses, that is, if USGs are transmitted to the user apparatuses, the radio resource control unit 22 assigns downlink radio resources to transmit the TPC bits generated at the TPC bit generation unit 14 together with the USGs. If there is no USG to be transmitted from the base station apparatus 20, the radio resource control unit 22 assigns downlink radio resources to transmit the TPC bits as the independent TPC bits.

As illustrated in FIG. 5, for example, the assignment of downlink radio resources to the independent TPC bits can be performed by using the downlink radio resources associated with radio resources for uplink L1/L2 control channels assigned to the user apparatuses in one-to-one correspondence. Alternatively, as illustrated in FIG. 6, the downlink radio resources for the independent TPC bits are assigned at constant periods from the last USG in associated with radio resources for the last USG transmitted to the user apparatuses. The radio resource control unit 22 possesses the correspondence for the radio resources for the independent TPC bits in tables or other forms (not illustrated) in advance. The radio resource assignment information (scheduling information) determined at the radio resource control unit 22 is supplied to the control channel generation unit 23.

The control channel generation unit 23 generates downlink control channels based on the assignment information (including both uplink assignment information and downlink assignment information) supplied from the radio resource control unit 22 and the TPC bits supplied from the TPC bit generation unit 24. In this embodiment, the generated control channels may be the control channels as illustrated in FIG. 4A, for example. The generated control channels are subjected to channel encoding and data modulation at a channel encoding unit and a modulation unit (not illustrated), respectively.

The multiplexing unit 25 multiplexes (maps) the (channel encoded and modulated) control channels generated at the control channel generation unit 23 and data channels destined for user apparatuses into physical channels. In this embodiment, the data channels are generated from the user data 1 through N destined for the user apparatuses based on the assignment information from the radio resource control unit 22 and are subjected to channel encoding and data modulation. The resulting signals multiplexed at the multiplexing unit 25 may have a mapping pattern as illustrated in FIG. 4B, for example.

The multiplexed signals are subjected to inverse fast Fourier transform, addition of a guard interval, D/A conversion, RF conversion, band limiting and/or others. The resulting signals are amplified and transmitted from a transmit antenna (not illustrated).

Figure 8:
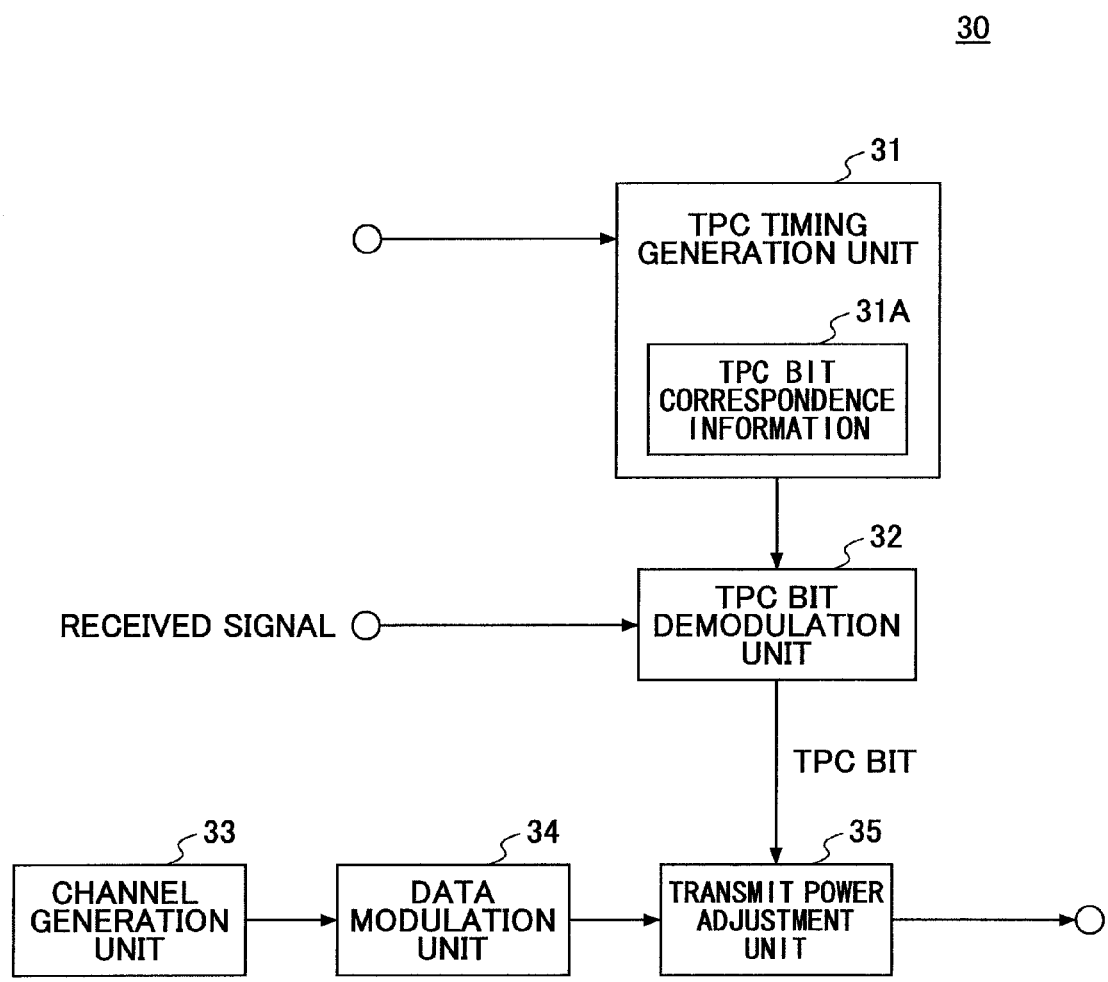
FIG. 8 illustrates an exemplary arrangement of a user apparatus according to one embodiment of the present invention.

FIG. 8 illustrates an exemplary arrangement of a user apparatus according to one embodiment of the present invention. A user apparatus 30 includes a TPC timing generation unit 31, a TPC bit demodulation unit 32, a channel generation unit 22, a data modulation unit 34 and a transmit power adjustment unit 35.

The TPC timing generation unit 31 includes TPC bit correspondence information 31A for associating resources assigned to independent TPC bits with some resources. The TPC bit correspondence information 31A may provide unambiguous correspondence to radio resources for transmitting SRSs as assigned to the user apparatus 30 in the first communication as illustrated in FIG. 5 or may provide some relationship assigned in association with radio resources for the last received USG periodically from the reception timing.

The TPC bit demodulation unit 32 extracts and demodulates an independent TPC bit from the received signal based on the radio resources and reception timing determined at the TPC bit timing generation unit 31. If a USG is demodulated from the received signal and a TPC bit in the USG is used, no information from the TPC timing generation unit 31 is required. The demodulated TPC bit is supplied to the transmit power adjustment unit 35. The transmit power adjustment unit 35 adjusts the transmit power level for the user user apparatus 30 based on the TPC bit.

On the other hand, the channel generation unit 33 generates data channels by using uplink radio resources assigned in USGs, uplink control channels for transmitting CQI reports or other control information, channels for transmitting SRSs and/or others. The data modulation unit 34 modulates the channels generated at the channel generation unit 33. The demodulated channels are mapped to physical channels at a multiplexing unit (not illustrated) and transmitted to the base station at transmit power set by the transmit power adjustment unit 35.

According to the arrangements and method of the above embodiments, even if there is no data channel to be transmitted from a user apparatus to a base station, an independent TPC bit is transmitted from the base station to the user apparatus. As a result, it is possible to ensure uplink transmit power control to some extent.

This international patent application is based on Japanese Priority Application No. 2007-161950 filed on Jun. 19, 2007, the entire contents of which are hereby incorporated by reference.

The invention claimed is:

1. A base station apparatus for use in a radio communication system using a shared channel, comprising:
   a transmit power control information generation unit configured to generate transmit power control information for a user apparatus based on an uplink signal transmitted from the user apparatus;
   a radio resource control unit configured to generate radio resource assignment information to, if an uplink radio resource is assigned to the user apparatus, transmit the generated transmit power control information together with an uplink assignment message and to, if no uplink radio resource is assigned to the user apparatus, transmit the generated transmit power control information as independent transmit power control information independently of the uplink assignment message.

2. The base station apparatus as claimed in claim 1, wherein the radio resource control unit is configured to determine which radio resource is assigned to the independent transmit power control information based on correspondence information for associating with predefined radio resources in one-to-one correspondence.

3. The base station apparatus as claimed in claim 2, wherein the correspondence information comprises information for associating a radio resource used to transmit the uplink signal with a radio resource used to transmit the independent transmit power control information to the user apparatus.

4. The base station apparatus as claimed in claim 2, wherein the correspondence information comprises information for associating a radio resource used to transmit the last uplink assignment message to the user apparatus with a radio resource used to transmit the independent transmit power control information to the user apparatus.

5. The base station apparatus as claimed in claim 1, further comprising:
   a control channel generation unit configured to generate a shared control channel including the independent transmit power control information based on the radio resource assignment information supplied from the radio resource control unit.

6. The base station apparatus as claimed in claim 5, wherein the control channel generation unit is configured to generate the shared control channel by multiplexing the independent transmit power control information into a same portion of the shared control channel.

7. The base station apparatus as claimed in claim 1, wherein the uplink signal transmitted from the user apparatus comprises control information transmitted in an uplink shared control channel and/or a reference signal transmitted in other uplink radio resources.

8. A user apparatus for use in a radio communication system using a shared channel, comprising:
   a timing generation unit configured to generate a timing for demodulating independent transmit power control information transmitted from a base station to the user apparatus independently of an uplink assignment message based on predefined correspondence to radio resources;
   a demodulation unit configured to extract and demodulate the independent transmit power control information from a received signal at the generated timing; and
   a transmit power adjustment unit configured to adjust transmit power for the user apparatus based on a result of the demodulation.

9. The user apparatus as claimed in claim 8, wherein the correspondence to radio resources comprises correspondence between a radio resource assigned to an uplink signal from the user apparatus to the base station and a radio resource used to transmit the independent transmit power control information.

10. The user apparatus as claimed in claim 8, wherein the correspondence to radio resources comprises correspondence between a radio resource used to transmit the last uplink assignment message from the base station to the user apparatus and a radio resource used to transmit the independent transmit power control information.

11. The user apparatus as claimed in claim 8, wherein the transmit power control information demodulation unit is configured to demodulate transmit power control information in an uplink assignment message destined for the user apparatus if the uplink assignment message is included in the received signal.

12. A transmit power control method for use in a radio communication system using a shared channel, comprising the steps of:
   generating transmit power control information for a user apparatus based on an uplink signal transmitted from the user apparatus; and
   transmitting, if an uplink radio resource is assigned to the user apparatus, the transmit power control information together with an uplink assignment message and transmitting, if no uplink radio resource is assigned to the user apparatus, the transmit power control information as independent transmit power control information independently of the uplink assignment message.

13. The transmit power control method as claimed in claim 12, further comprising associating a radio resource assigned to the independent transmit power control information with a predefined radio resource in one-to-one correspondence.

14. The transmit power control method as claimed in claim 13, wherein the step of associating comprises associating a radio resource used to transmit the uplink signal with a radio resource used to transmit the independent transmit power control information for the user apparatus.

15. The transmit power control method as claimed in claim 13, wherein the step of associating comprises associating a radio resource used to transmit the last uplink assignment message to the user apparatus and a radio resource used to transmit the independent transmit power control information to the user apparatus.

16. The transmit power control method as claimed in claim 12, further comprising generating a shared control channel including the independent transmit power control information.

17. The transmit power control method as claimed in claim 16, wherein the step of generating a shared control channel comprises multiplexing the transmit power control information for the user apparatus into a same portion of the shared control channel.

* * * * *